June 27, 1933.  G. ANDERSON  1,915,350
CONDUIT TRIMMER
Filed Oct. 20, 1931
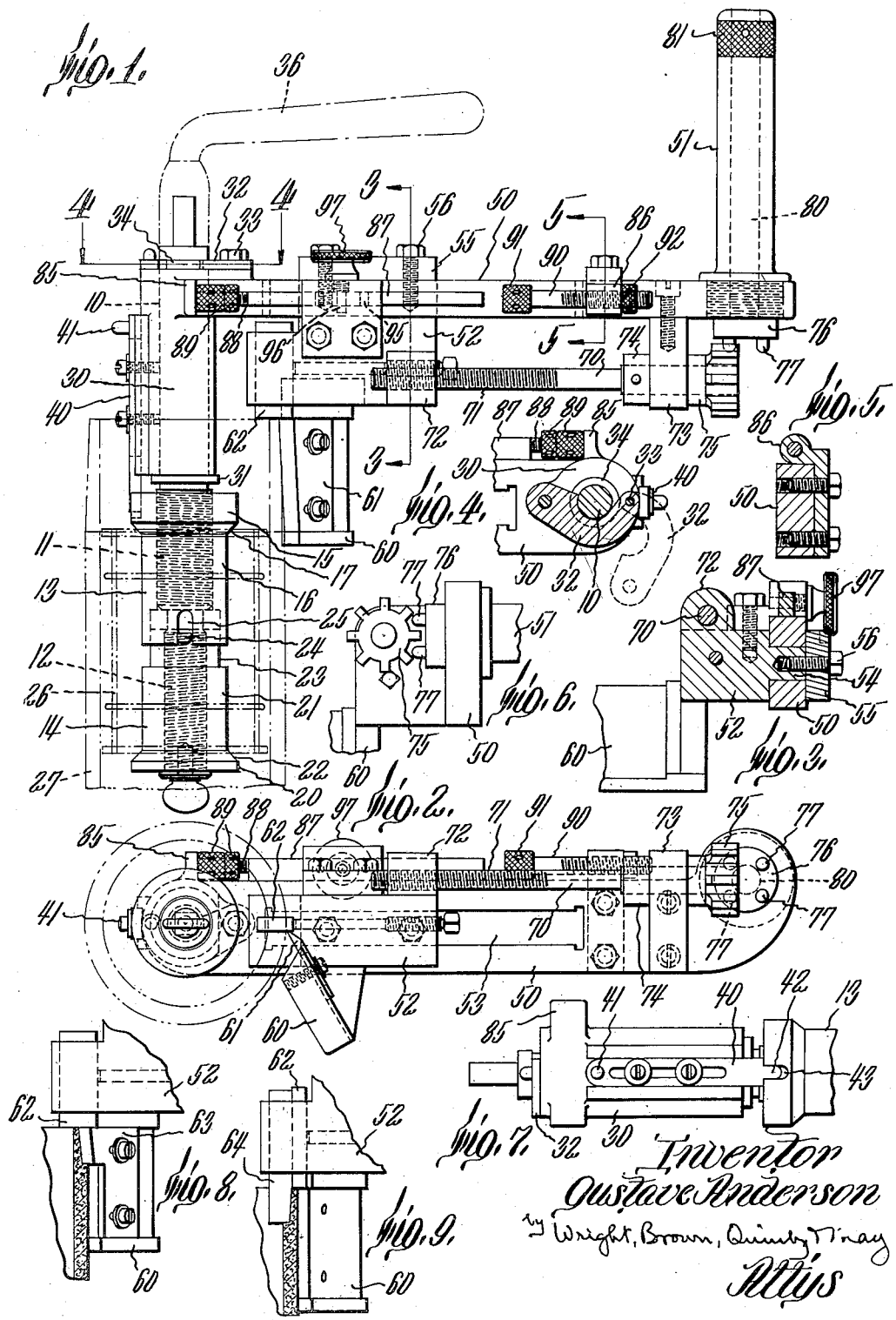

Patented June 27, 1933

1,915,350

UNITED STATES PATENT OFFICE

GUSTAVE ANDERSON, OF BERLIN, NEW HAMPSHIRE, ASSIGNOR TO BROWN COMPANY, OF BERLIN, NEW HAMPSHIRE, A CORPORATION OF MAINE

CONDUIT TRIMMER

Application filed October 20, 1931. Serial No. 569,925.

This invention relates to portable mechanism adapted to trim the ends of sections of conduit, more especially waterproofed fiber conduit such as is now widely used for many purposes. Such conduit is customarily made in standard lengths. In laying such conduit, it frequently happens that a turn or bend must be made at a definite point and that a section of conduit must be cut in order to have it end at that proper point. The conduit sections are customarily shipped from the mill with their ends suitably finished for forming joints. These joints may be drive joints, threaded joints or any other desired kind. If a portion is sawed from one end of a section of conduit, it then becomes necessary to trim the sawed end so that this end will be capable of fitting into a suitable coupling element to form a tight joint. The trimming must be accurately done if the resulting joint is to be satisfactory. It is impractical to send such pieces back to the mill for trimming. The purpose of the present invention is to provide a field machine for trimming ends of tubes easily and accurately, an object of the invention being to provide a mechanism which is relatively light, simple and inexpensive, but one which is capable of sufficiently accurate work. For a more complete understanding of the invention, reference may be had to the disclosure thereof in the description which follows, and on the drawing, of which,—

Figure 1 is a plan view of an embodiment of the invention.

Figure 2 is an end elevation of the same.

Figure 3 is a section on the line 3—3 of Figure 1.

Figure 4 is a section on the line 4—4 of Figure 1.

Figure 5 is a section on the line 5—5 of Figure 1.

Figure 6 is a fragmentary elevation of the end portion of the crank lever.

Figure 7 is an elevation of a portion of the mechanism shown in Figure 1.

Figure 8 is a plan view of a portion of the tool carriage showing a tool different from that shown in Figure 1.

Figure 9 is similar to Figure 8 except that it shows another kind of tool.

The structure illustrated on the drawing includes a shaft 10 having reversely threaded portions 11 and 12. As shown, the portion 11 is provided with a left hand screw thread, the portion 12 being reduced in diameter and threaded with a right hand thread. A pair of core members 13 and 14 for an expanding mandrel are mounted respectively on the threaded portions 11 and 12, these core members being correspondingly threaded for engagement therewith. The core member 13 has an end portion 15 and a body portion 16 of reduced diameter, the surfaces of these two portions being connected by a conical surface 17. The member 14 likewise has an end portion 20 and a body portion 21 of reduced diameter, the surfaces of these two portions being connected by a conical surface 22. The core member 14 is furthermore provided with a reduced end portion 23 adapted to telescope within the end portion 16 of the core member 13. On this reduced portion 23 is a suitable pin or key 24 axially slidable in a slot 25 in the end of the core member 13 so as to prevent relative rotation between the core members when they are mounted on the shaft 10. A suitable expanding mandrel 26, indicated in dotted lines in Figure 1, normally rests on the surface of the portions 16 and 21 of the core members. When the core members are moved toward each other axially, portions of the mandrel ride on the inclined surfaces 17 and 22, thus expanding the mandrel so as to grip the inner wall of a pipe or conduit 27 which has previously been placed thereon, a portion of such pipe being indicated in Figure 1 in broken lines. Rotatably mounted on the shaft 10 is a crank boss 30, one end of this boss bearing against a suitable collar or flange 31 which separates the boss from the threaded portions 11 and 12 of the shaft. The boss is held in place at its other end by a suitable locking mechanism which, as shown, may comprise a locking plate 32 pivotally mounted on the boss as at 33, this plate having a portion adapted to enter a peripheral groove 34 in the shaft 10 at the end of the boss remote from the collar 31. The end portion of the shaft 10 adjacent to the groove 34 is preferably reduced and squared to receive a removable operating handle 36. The boss 30 carries an axially slidable key 40 provided with a suitable handle knob 41 at one end and a projecting end portion 42 at the other end, the latter being adapted to enter a notch 43 in the near end of the core member 13 to hold this core member, and consequently, the other core member as well, against rotation relative to the boss 30. Hence, when the key 40 is engaged in the notch 43 and the boss 30 is held against rotation, rotation of the shaft 10 by means of the handle 36 will cause axial movement of the core members 13 and 14 toward or away from each other according to the direction of rotation. Such motion of the core members will either expand the mandrel 26 or permit it to contract. Thus the mandrel may be secured within a tube or released therefrom.

Extending radially from the boss 30 is a crank web or arm 50 which, as shown, is integral with the boss. At the outer end of the arm 50 is fixed a crank handle 51, the surface of this crank handle being preferably smooth so as to permit the hand of the operator to slip easily thereon when the crank is being revolved about the shaft 10. A suitable tool carriage 52 is slidably mounted on the crank arm 50 for longitudinal movement thereon, that is, movement radial with respect to the boss 30. To this end, the arm 50 may be provided with a longitudinal slot 53 to receive a rib 54 of the tool carriage 52. The rib 54 is slidably fitted within the groove 53 and is retained therein as by a plate 55 secured to the rib 54 as by a pair of screws 56, portions of the plate 55 being arranged to bear against the face of the arm 50 opposite the tool carriage 52. The carriage is provided with a lateral projection 60 on which may be mounted tools of suitable shape for making desired cuts in trimming the ends of conduit sections. In Figure 1 is shown a simple tool 61 mounted on projection 60, this tool having a cutting edge arranged at an angle to the axis of the shaft 10 so as to produce a taper cut on the end portion of a conduit section gripped by the expanding mandrel 26. The tool carriage may also have an end trimming tool 62, as shown in Figure 1, for smoothing the end edge of the conduit section. Instead of the tool 61 illustrated in Figure 1, I may employ a tool 63, as shown in Figure 8, adapted to make a shorter tapered cut terminating in a shoulder. Figure 9 illustrates a tool 64 adapted to make an interior cut within the end of a conduit section complemental to the cut made by the tool 63. It is evident that cuts of other shapes may be made by mounting suitable tools on the tool carriage 52.

The tool carriage is mounted for radial movement with respect to the shaft 10 and the work 27. Thus when a tube is to be trimmed, the tool is set at the proper position radially outward from the shaft, then is moved radially inward until the desired amount of trimming has been completed. It is desirable that at each revolution the tool shall cut a chip of correct thickness so as not to cause undue resistance to the cutting action of the tool and consequent rough cutting or tearing of the material of the work. To insure chips of proper size, means is provided for feeding the tool carriage radially inward by definite increments with each revolution of the crank on which it is carried. To this end, a feed screw 70 is provided, a portion of this screw being threaded as at 71 for threaded engagement in a lug 72 fixed on or integral with the tool carriage 52. The portion of the feed screw 70 remote from the threaded end portion is supported by a bearing member 73 mounted on the crank arm 50 near the outer end thereof. The feed screw 70 is rotatable in this bearing member 73 but is held against axial movement relative thereto by a collar 74 and a gear wheel 75, both of which are fixed on the screw 70. It is evident that rotation of the screw 70 will result in a movement of the tool carriage 52 toward or from the shaft 10 according to the direction of rotation of the feed screw 70. Meshing with the gear wheel 75 is a cooperating pin gear 76. This gear may be provided with one or more pins 77 adapted to engage between successive teeth of the gear wheel 75. Two such pins 77 are illustrated on the drawing. The gear 76 is mounted on a gear shaft 80 which projects longitudinally through the crank handle 51 and is rotatable therein. On the end of the shaft 80 remote from the gear 76 is a collar 81 which, as shown, is flush with the cylindrical surface of the handle 51 and is preferably knurled to provide a grip for the little finger of the operator grasping the handle 51. As the crank is operated, the handle 51 slides within the hand of the operator. The gripping element 81 of the gear shaft 80 may be gripped or not as desired. If gripped, the gear 76 will rotate with respect to the lever 50 as the latter is swung around the axis of the shaft 10. This results in an intermittent movement of the tool carriage 52 which advances the cutting tools toward the work if the crank is operated in one direction, or away from the work if the crank is operated in the other direction.

Different limits may be set to the feeding movement of the tool carriage 52 in order to avoid trimming away too much of the work. These limits are preferably defined by adjustable stops. One such stop 85 is fixed on or integral with the boss 30. An opposing stop 86 is fixed on the arm 50 at a suitable distance from the stop 85. Between these stops is a rod 87 mounted on the tool carriage and movable in line with these stops so as to engage one or the other, according to the direction of motion, to limit the travel of the tool carriage. In order to adjust the limits of movement of the tool carriage, the rod 87 is reduced and threaded as at 88 to receive a pair of nuts 89 thereon, one of these nuts being adjustable lengthwise with respect to the rod 87 to determine the limit of movement of the tool carriage toward the work, the other nut being a lock nut. The stop member 86 is internally threaded to receive a bolt 90, the head 91 of which is adapted to be engaged by an end of the rod 87 to limit the outward movement of the tool carriage 52. A lock nut 92 may be provided to hold the bolt 90 in adjusted position. The purpose of the stop member 86 is to provide a definite limit for the outward movement of the tool carriage when an interior cut is being made in the end of a pipe section as indicated in Figure 9. In order to facilitate the change of feed to suit conduits of different nominal sizes, the rod 87 may be carried by the tool carriage 52 in any one of a number of different longitudinal positions having a definite space relation between them corresponding to the different sizes of tubes to be cut. Thus the rod 87 may be provided with a number of spaced holes 95 adapted to receive an end 96 of a set screw 97. This end portion 96 fits closely in any one of the holes 95 and holds the rod 87 against longitudinal movement relative to the carriage 52.

In operating the mechanism, a conduit section 27 is mounted in a suitable vice or other holding means (not shown). The mechanism with an expanding mandrel 26 is brought to the work and the mandrel is inserted therein. The key 42 is moved by manipulation of the knob 41 to engage in the slot 43. The tool 36 is then operated to rotate the shaft 10 until the mandrel 26 is expanded to grip the interior of the conduit section firmly, the operator grasping the crank handle at the same time to hold the core members 13 and 14 against rotation. Thus the mechanism is supported by the conduit in correct position for cutting. Then the slide 40 is retracted so as to disengage the key 42 from the slot 43 and thus to permit the rotation of the crank 30 without disturbing the core members 13 and 14. Previous to the insertion of the mandrel into the work, the tool carriage 52 should be suitably retracted from the shaft 10. When the mechanism is in place for operation, the handle 51 is grasped, the knurled collar 81 being gripped by the little finger of the operator. As the crank is turned about the axis of the work, the carriage is fed inwardly until the knife begins to cut, a thin chip being taken off with each revolution of the crank. Rotation of the crank is stopped when the bar 87 engages the stop 85 if exterior trimming is being done, or the stop 86 if interior trimming is being done. The crank may then be revolved in the opposite direction to withdraw the tool from the work, the slide 40 is moved to engage in the slot 43, and the core members 13 and 14 are thereupon moved apart by operation of the handle 36 while the crank is held stationary to release the work from the mandrel. The mechanism is then ready to trim another conduit section in the same manner.

Instead of relying on the stops 85 and 86 to determine whether a tube end has been sufficiently trimmed to make a suitable couple, the operator may use his judgment as to how far to trim the tube end. The result may be quickly and easily tested by slipping the boss 30 with the crank and tools off from the shaft 10 and trying on a coupling member or complementally trimmed tube end to see if a proper joint is made therewith. To remove the boss and crank, it is necessary merely to swing the locking plate outwardly. The boss then comes right off the shaft. If further trimming is found to be necessary, the boss and crank are easily slipped into place ready for cutting as the centering of the shaft 10 with respect to the work has not been disturbed.

It will be apparent to one skilled in the art that various alterations and changes may be made in the structure herein shown and described without departing from the spirit or scope of the invention as defined by the following claims.

I claim:—

1. Mechanism of the class described comprising a shaft, an expanding mandrel mounted on said shaft adjacent to one end thereof, a crank arm mounted on said shaft near the opposite end thereof and revoluble relatively thereto, said shaft having a circumferential groove near said opposite end, means releasably locking said crank arm against removal from said shaft, including a locking member normally having a portion in said groove and a portion projecting therefrom, and a tool carriage on said crank arm.

2. Mechanism of the class described comprising a shaft, an expansible mandrel mounted on said shaft, a crank arm revolubly mounted on said shaft, a tool carriage movable on said arm toward and from said shaft, a feed screw carried by said arm in threaded engagement with said carriage, a gear wheel mounted on said feed screw, a hollow crank handle fixed to said arm and parallel with said shaft, said handle having a longitudinal bore therethrough, a gear shaft rotatably mounted in said bore, a gear at one end of said gear shaft meshing with the gear wheel on the feed screw, and a grip member mounted on the other end of the said gear shaft.

3. Mechanism of the class described comprising a shaft, having reversely threaded portions, a pair of core members mounted respectively on said threaded portions and keyed together to prevent relative rotation, a rotatable boss on said shaft, means for releasably locking said boss against rotation relative to said core members, a crank arm projecting from said boss, a crank handle on said arm having one portion fixed and another portion rotatable relatively to said arm, a tool carriage slidable on said arm from and toward said boss, a feed screw for said carriage rotatably mounted on said arm, and means operatively connecting said feed screw and the rotatable portion of said handle.

In testimony whereof I have affixed my signature.

GUSTAVE ANDERSON.